Jan. 23, 1968     C. W. HULSE     3,364,910
FLOW RESTRICTING MEANS FOR CRANKCASE VENTILATION SYSTEMS
Filed March 24, 1966
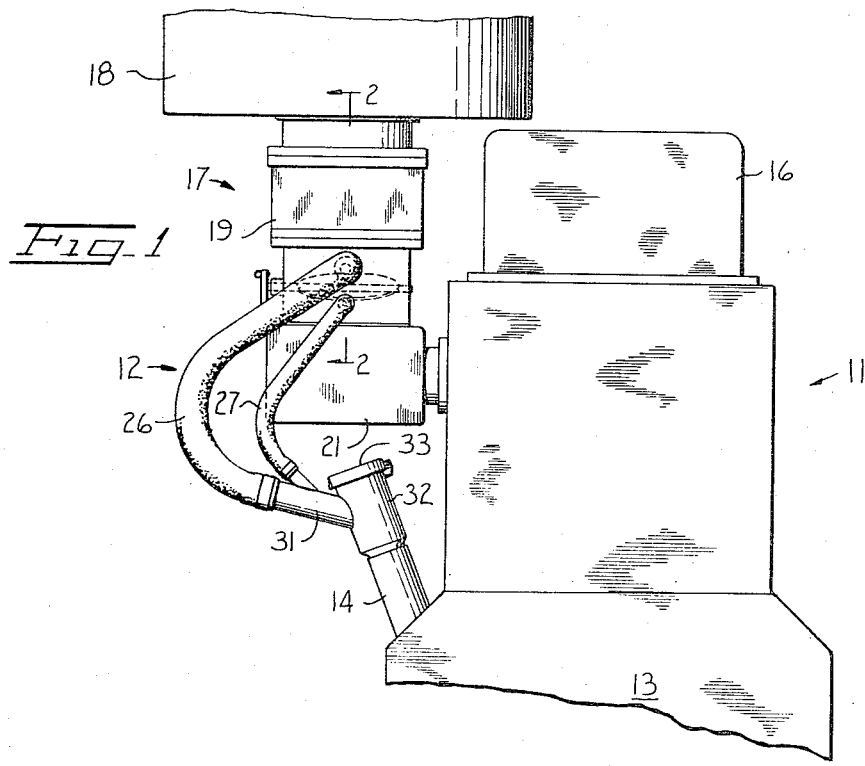
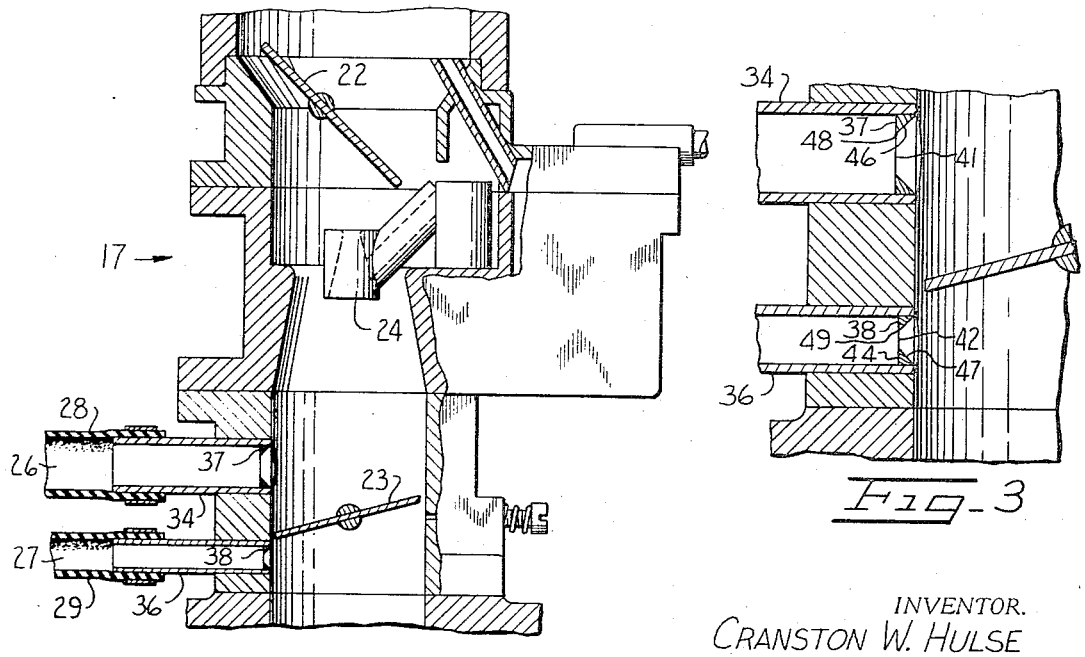
INVENTOR.
CRANSTON W. HULSE
BY
Gardner & Zimmerman
ATTORNEYS

United States Patent Office 3,364,910
Patented Jan. 23, 1968

3,364,910
FLOW RESTRICTING MEANS FOR CRANKCASE
VENTILATION SYSTEMS
Cranston W. Hulse, Oakland, Calif., assignor to Auto-Quip, Inc., Oakland, Calif., a corporation of California
Filed Mar. 24, 1966, Ser. No. 537,051
8 Claims. (Cl. 123—119)

This invention relates to systems for directing fumes accumulating in the crankcase of an internal combustion engine to the engine's fuel induction system, and relates more particularly to an improved flow restricting means for limiting the amount of fume flow into the induction system.

During the operation of an internal combustion engine, fumes tend to accumulate in the engine's crankcase as a result of oil and moisture vaporization, and flow of fumes past the engine pistons. These fumes generally contain a relatively large proportion of carbon, tar, and other particulate matters. Not only do these fumes act deleteriously on the oil and engine parts, but when they escape to the atmosphere, they become one of the major causes of atmospheric contamination. Because of this, various arrangements have been devised to remove the fumes from the engine crankcase and convey them to the fuel induction system so that the fumes will be burned with the incoming fuel charge. These arrangements, commonly called crankcase ventilation systems, generally involve the use of one or more conduits or ducts connecting the crankcase to the fuel induction system to provide a passage for the flow of the fumes to the induction system.

For a crankcase ventilating system to be effective, it must remove substantially all the fumes from the crankcase under all different engine operating conditions, yet avoid admitting enough fumes or air into the induction system to adversely affect the air-fuel ratio of the fuel charge. For this reason the flow capacity of the passages must be critically controlled. This control is generally provided, at least in part, by properly sizing the flow passage, or by providing a restriction or other flow control device within such passage to define a flow control orifice. As mentioned, however, the crankcase fumes contain a relatively large proportion of condensibles and particulate matter, and unfortunately, in most types of ventilation systems, if the passage or a flow controlling or restricting orifice is properly sized to provide the necessary flow capacity, the passage or orifice becomes so small that the condensibles and particulate matter tend to separate from the fumes and build up within the passage. This build-up adversely affects the performance of the ventilating systems, and with some systems if the build-up completely clogs up the passage it can cause serious damage to the engine. The build-up is especially disadvantageous in ventilation systems which do not have valves or the like in the passage or passages and rely solely on the sizing of the passages to provide the proper limitation on the flow of the fumes from the crankcase. Even a substantially small amount of build-up within the passage or passages of such a system can alter the system's characteristics and adversely affect its performance.

Accordingly, it is an object of the present invention to provide a crankcase fume ventilation system having an improved flow restricting means which will not become clogged by the condensibles or particulate matter in the crankcase fumes.

Another object of the present invention is to provide a flow restricting means of the character described which is self-cleaning.

A still further object of the present invention is to provide a non-clogging crankcase fume flow restricting means which is especially adapted for use with crankcase ventilating systems which do not rely upon valves for the control of the flow of fumes.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawing:

FIGURE 1 is an end elevation of an internal combustion engine having a crankcase fume ventilation system for which the present invention is particularly adapted.

FIGURE 2 is a vertical sectional view, partly in elevation, taken on the line 2—2 of FIGURE 1 and depicting a preferred embodiment of the flow restricting means of the present invention.

FIGURE 3 is an enlarged view of the area of connection between the fuel induction system of the engine and the ventilation system illustrating the flow restricting device means shown in FIGURE 2 in more detail.

The invention in its present form is shown and described in connection with an engine 11 having a crankcase ventilation system 12 for which the invention is particularly adapted. The engine includes a crankcase 13 having an oil filler pipe 14, and a valve chamber cover 16. The valve chamber enclosed by cover 16 communicates with the crankcase through passages internally of the engine. Crankcase fume ventilation systems are often connected to the valve chamber cover rather than directly to the crankcase, or they may be connected to other parts of the engine in communication with the crankcase. For this reason it is to be understood that the term crankcase as used herein is meant to include any or all of these parts of an engine in which the crankcase fumes accumulate.

Engine 11 also includes a conventional fuel induction system 17 having an induction passage in which the fuel charge is mixed and fed to the cylinders of the engine. The induction system as here shown includes an air cleaner 18, a carburetor 19, and a fuel intake manifold 21. As best depicted in FIGURE 2, the carburetor includes the usual choke and throttle valves 22 and 23, respectively. Fuel introduction means, such as the venturi vaporizer sleeve 24 and the usual gas jets, are provided intermediate choke valve 22 and throttle valve 23.

The crankcase fume ventilation system 12 is of the general type disclosed in copending applications Ser. No. 339,005, filed Jan. 20, 1964, now Patent No. 3,241,535, for Vacuum Flow Control for Crankcase Ventilation and Ser. No. 509,035, filed Nov. 22, 1965 for Crankcase Ventilation System, both by William R. Drysdale. This type of system has two passages 26 and 27 which are here shown provided in conduits 28 and 29 extending between and connecting the crankcase and fuel induction system. For connection to the crankcase, these conduits are suitably attached to a tubular Y extension 31 on a hollow fitting 32. The fitting 32 snugly fits within the oil filler pipe 14 of the crankcase, and is provided with a removable cap 32 to permit introduction of oil to the crankcase. The conduits 28 and 29 are provided with tubular nipples 34 and 36, respectively, which extend through the wall of carburetor 19 to the fuel induction passage.

As shown, nipple 34 communicates with the induction passage above or anterior to the throttle valve 23, whereas the nipple 36 communicates therewith below or posterior to such valve. With this type of arrangement, no valves are needed in the passages when the latter are provided with the proper flow capacities. More particularly, the combined flow capacity of both of the passages should be such that when the throttle valve 23 is open, all of the fumes generated within the crankcase are introduced into the induction system without materially affecting the air-fuel ratio of the fuel charge, and the flow capacity of the lower passage should be such that when the throttle valve 23 is closed, i.e., when the engine is idling, substantially all the fumes in the crankcase can flow through this passage into the induction system without adversely changing the air-fuel ratio.

The flow restricting means of the instant invention provides for the necessary flow capacities of the passages without causing build-up of condensibles or particulate matters within the passages. In the embodiment shown, each of the passages 26 and 27 is provided with a flow restricting means in the form of a ring or internal peripheral flange 37 and 38, respectively, which are positioned within the nipples 34 and 36. The flanges 37 and 38 define circular orifices 41 and 42, respectively, designed to provide the proper flow capacities. The cross-sectional area of the orifices will depend, of course, on the particular type of system and desired capacity thereof. For example, in the system shown in the drawings wherein the two passages communicate with the induction passage immediately above and below to the throttle valve, for a common automobile engine, the orifice 41 should have a minimum cross-sectional area of .11 square inch (.375 inch diameter) so as to be certain that the fumes generated under all operating conditions, except idling, can be exhausted. The cross-sectional area of the orifice 42 in the lower passage depends on the engine size and should be in the range between $4.4 \times 10^{-3}$ square inches (.075 inch diameter) and $1.6 \times 10^{-2}$ square inches (.14 inch diameter). For best results with engines having combustion chamber capacities up to 140 cubic inches, the cross-sectional area of the orifice 37 should be about $5.8 \times 10^{-3}$ square inches (.086 inch in diameter); for engines having combustion chamber capacities between 140 cubic inches and 250 cubic inches, the cross-sectional area should be about $8.8 \times 10^{-3}$ square inches (.106 inch in diameter); and for engines having combustion chamber capacities greater than 250 cubic inches, this orifice should have a cross-sectional area of about $1.25 \times 10^{-2}$ square inches (.125 inch in diameter).

Each of the flanges 37 and 38 has a flat annular surface or face 43 and 44, respectively, circumscribing its orifice. The faces 43 and 44 extend between the walls 46 and 47 of the orifices and the inner wall surfaces of the nipples. The faces 43 and 44 are arranged in confronting relationship to the flow of crankcase fumes through the nipples to the induction passage. Furthermore, they are normal to the wall surfaces of the nipples and are therefore substantially perpendicular to the flow of the fumes.

As best seen in FIGURE 3, the walls 46 and 47 of the orifices taper or flare outwardly from the faces 43 and 44 to the discharge end of the orifice. This not only provides progressively increasing cross sectional area of the orifices in the direction of the fume flow therethrough, but also provides a knife edge 48 and 49 at the juncture of the orifice walls and the faces 43 and 44 respectively.

It is to be appreciated that the crankcase fumes will be flowing through the passages 26 and 27 at a very high velocity which will generally exceed the speed of sound. The provision of the faces 43 and 44 perpendicularly confronting this high velocity flow in combination with the venturi effect provided by the flaring walls 46 and 47 results in a high flow turbulence immediately in front of the faces. This turbulence assures enough agitation of any condensibles and particulate matter which separate from the fumes in this area, to cause such condensibles and particulate matters to be carried with the fumes through the orifices rather than collecting upon the passage and flange surfaces.

The amount of confronting surface area provided by the faces 43 and 44 will generally depend on the difference between the diameters of the passages adjacent the flow control devices and the diameters of the orifices at the knife edges. In this regard, the passages 26 and 27 themselves should have a large enough cross-sectional area throughout their length that there is substantially no condensation or separation of the particulate matter from the fumes. In the example previously set forth, the upper passage should desirably have a minimum cross-sectional area of .96 square inch (.5 inch in diameter) and the lower passage should have a minimum cross sectional area of .11 square inch (.375 inch in diameter). For best results in assuring that the desired flow turbulence is obtained in all systems, the faces should completely surround the orifice and have a dimension of at least about .04 inch between the orifices and the wall surfaces defining the passage.

The angle of the flaring surfaces 46 and 47 with respect to the faces 43 and 44 is not particularly critical as long as it is sufficient to provide the relatively sharp knife edges 48 and 49 and the definitely sloping walls 46 and 47 affording the venturi effect. In this regard, the angle of the surfaces 46 and 47 with respect to the faces 43 and 44 is desirably in the range between 15° and 75°.

The provision of the sharp knife edges as will be evident, eliminates any surface area at the entry of the orifice upon which condensibles and particulate matter can collect. As will be noted the flaring walls of the orifice terminate at the discharge end without there being a shoulder on the downstream side of the orifice behind which condensibles and particulate matter can collect. Moreover, as will be clear, the crankcase fumes after passing into the orifice expand along the flaring surface to provide a strong sweeping action thereat to prevent the condensibles and particulate matter from collecting on such surface.

It has been found advantageous to locate the flanges 37 and 38 so that the discharge end of the orifices meets the induction passage. With this arrangement, further assurance is provided that there will be no build up of condensibles and particulate matter downstream of the orifice. Furthermore, this particular location of the discharge end of the orifices of the flanges results in all of the exposed flange surfaces being thoroughly "washed" by the fuel when the engine is stopped. This is because after an engine is stopped some residual fuel from the carburetor runs down the inner walls of the induction passage, and when this fuel reaches the openings provided by the ventilation system passages, the fuel runs inwardly and over the flaring surfaces 46 and 47. Some of this fuel will also reach the knife edges and the lower portions of the faces 43 and 44. The fuel seems to wet the surfaces aforesaid and acts as a solvent to prevent the adherence on such surfaces of any condensibles and particulate matter which might settle thereon due to the decrease in velocity of the crankcase fumes as the engine is stopped.

While in the embodiment described, the flow restricting means are provided by flange inserts placed within the passages, it is to be understood that such means could also be provided in other ways such as by crimping the nipples or the conduits defining the passages. Furthermore, it is to be appreciated that in most ventilation systems utilizing valves to partially control the flow of the fumes, only one passage is provided and therefore only one flow restricting device is necessary. Moreover, while it is desirable in the fume ventilation system described that both passages be provided with a flow restriction device, beneficial results are also obtained when a flow restricting device is provided in only one of the passages, such as in the lowermost one.

What is claimed is:

1. In a fume ventilation system for an internal combustion engine wherein said system has a passage communicating with the fuel induction system for the flow of fumes to the induction system, flow restricting means within said passage providing an orifice for limiting the amount of fume flow through said passage to said induction system, said means including a face arranged in confronting and substantially perpendicular relationship to the flow of fumes through said passage and extending between said orifice and the adjacent wall surfaces defining said passage so as to cause flow turbulence at said face, the orifice being bounded adjacent the fume entry end thereof by a knife edge and increasing in cross-sectional area substantially from said knife edge to the discharge end of the orifice.

2. The combination set forth in claim 1 wherein said flow restricting means is located within said passage at its point of communication with said induction system and with said discharge end of said orifice being at the end of said passage.

3. The combination set forth in claim 2 wherein said induction system includes a fuel charge forming device having fuel introduction means and said passage communicates with said induction system posterior to said fuel introduction means.

4. The combination set forth in claim 1 wherein said fume ventilation system is a crankcase ventilation system of the type in which said passage extends between the engine crankcase and said induction system and is free of valves.

5. The combination of claim 1 wherein said fume ventilation system is a crankcase ventilation system of the type in which said passage communicates the engine crankcase with said induction system posterior of the throttle valve of the charge forming device and is free of valves between said crankcase and said induction system, and wherein said flow restricting means is located within said passage at its point of communication with said induction system and with said discharge end of said orifice being at the end of said passage.

6. The combination of claim 5 wherein said crankcase fume ventilation system includes a second passage between the engine crankcase and the fuel induction system with said second passage communicating with said induction system anterior of the throttle valve of the charge forming device thereof, and wherein a second flow restricting means is located within said second passage providing an orifice for limiting the amount of fume flow through said passage to said induction system, said means including a face arranged in confronting and substantially perpendicular relationship to the flow of crankcase fumes through said passage and extending between said orifice and the adjacent wall surfaces defining said passage so as to cause flow turbulence at said face, the orifice of said second means being bounded adjacent the fume entry end thereof by a knife edge and increasing in cross-sectional area substantially from said knife edge to the discharge end of said orifice.

7. A combination set forth in claim 6 wherein said second flow restricting means is located within said second passage at its point of communication with said induction system and with said discharge end of said orifice being at the end of said second passage.

8. The combination set forth in claim 6 wherein said crankcase fume ventilation system is of the type in which said second passage between said crankcase and said induction system is free of valves.

References Cited
UNITED STATES PATENTS

| | | | |
|---|---|---|---|
| 2,971,505 | 2/1961 | Fortney | 123—119 |
| 3,073,293 | 1/1963 | Barker | 123—119 |
| 3,111,120 | 11/1963 | Cornell | 123—119 |
| 3,170,448 | 2/1965 | Campbell | 123—119 |
| 3,177,858 | 4/1965 | Vanderpoel | 123—119 |
| 3,179,095 | 4/1965 | Linn | 123—119 |
| 3,241,535 | 3/1966 | Drysdale | 123—119 |

FOREIGN PATENTS 1,331,453  5/1963  France.

AL LAWRENCE SMITH, *Primary Examiner.*